(12) United States Patent
    Clark

(10) Patent No.: US 9,758,084 B1
(45) Date of Patent: Sep. 12, 2017

(54) ADJUSTABLE CARGO SECURING STRAP

(71) Applicant: Randy Clark, Lewiston, ID (US)

(72) Inventor: Randy Clark, Lewiston, ID (US)

(*) Notice: Subject to any disclaimer, the term of this patent is extended or adjusted under 35 U.S.C. 154(b) by 0 days.

(21) Appl. No.: 15/431,481

(22) Filed: Feb. 13, 2017

(51) Int. Cl.
    *B60P 7/08* (2006.01)

(52) U.S. Cl.
    CPC ............ *B60P 7/0823* (2013.01); *B60P 7/083* (2013.01); *B60P 7/0846* (2013.01)

(58) Field of Classification Search
    CPC ........ B60P 7/0823; B60P 7/083; B60P 7/0846
    USPC ................... 410/20–21, 23, 96, 97, 100, 117
    See application file for complete search history.

(56) References Cited

U.S. PATENT DOCUMENTS

| | | | |
|---|---|---|---|
| D273,273 S | 4/1984 | Faidide | |
| 5,888,039 A * | 3/1999 | Cooley | B60P 7/12 410/36 |
| 7,214,014 B2 * | 5/2007 | Stanley | B60P 7/0823 410/100 |
| 7,252,316 B2 | 8/2007 | Wallace et al. | |
| D628,877 S | 12/2010 | Stevens | |
| 8,870,504 B2 * | 10/2014 | Wienke | B60P 7/0823 410/118 |

* cited by examiner

*Primary Examiner* — Stephen Gordon
(74) *Attorney, Agent, or Firm* — Stevenson IP, LLC

(57) ABSTRACT

An adjustable cargo securing strap including an adjustable first ratchet strap and each of a pair of ratchet strap S hooks attached to each of a first end and a second end, respectively, of the adjustable first ratchet strap. A hook member is attached to an upper surface of one of the pair of ratchet strap S hooks. Each of a proximal attachment member and a distal attachment member is disposed on each of a proximal end and a distal end, respectively, of a rubberized second strap. A second strap S hook is disposed through an aperture of the distal attachment member, and the hook member is selectively slidably engageable within an aperture of the proximal attachment member.

2 Claims, 3 Drawing Sheets

ADJUSTABLE CARGO SECURING STRAP

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of straps are known in the prior art. However, what has been needed is an adjustable cargo securing strap including an adjustable first ratchet strap and each of a pair of ratchet strap S hooks attached to each of a first end and a second end, respectively, of the adjustable first ratchet strap. What has been further needed is a hook member attached to an upper surface of one of the pair of ratchet strap S hooks and each of a proximal attachment member and a distal attachment member disposed on each of a proximal end and a distal end, respectively, of a rubberized second strap. Lastly, what has been needed is for a second strap S hook to be disposed through an aperture of the distal attachment member, and for the hook member to be selectively slidably engageable within an aperture of the proximal attachment member. The uniquely structured combination of both the adjustable first ratchet strap and the rubberized second strap allows for the better securement of cargo within a container or trailer.

FIELD OF THE INVENTION

The present invention relates to straps, and more particularly, to an adjustable cargo securing strap.

SUMMARY OF THE INVENTION

The general purpose of the present adjustable cargo securing strap, described subsequently in greater detail, is to provide an adjustable cargo securing strap which has many novel features that result in an adjustable cargo securing strap which is not anticipated, rendered obvious, suggested, or even implied by prior art, either alone or in combination thereof.

To accomplish this, the present adjustable cargo securing strap includes an adjustable first ratchet strap having a first end and a second end. A pair of ratchet strap S hooks includes a first ratchet strap S hook and a second ratchet strap S hook, with each of the first ratchet strap S hook and the second ratchet strap S hook having an upper surface and a lower surface. Each of the first ratchet strap S hook and the second ratchet strap S hook is attached to each of the first end and the second end, respectively, of the adjustable first ratchet strap. A substantially C-shaped hook member is upwardly extended and attached to the upper surface of one of the first ratchet strap S hook and the second ratchet strap S hook.

The adjustable cargo securing strap further includes a rubberized second strap, optionally EPDM rubber, having a proximal end and a distal end. A pair of attachment members includes a proximal attachment member and a distal attachment member, with each of the proximal attachment member and the distal attachment member having a top side, a bottom side, and an aperture continuously disposed from the top side to the bottom side. Each of the proximal attachment member and the distal attachment member is disposed on each of the proximal end and the distal end, respectively, of the rubberized second strap. A second strap S hook is disposed through the aperture of the distal attachment member, and the substantially C-shaped hook member is selectively slidably engageable within the aperture of the proximal attachment member. The adjustable first ratchet strap attachable to the rubberized second strap allows for the better securement of cargo within a container or trailer.

Thus has been broadly outlined the more important features of the present adjustable cargo securing strap so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
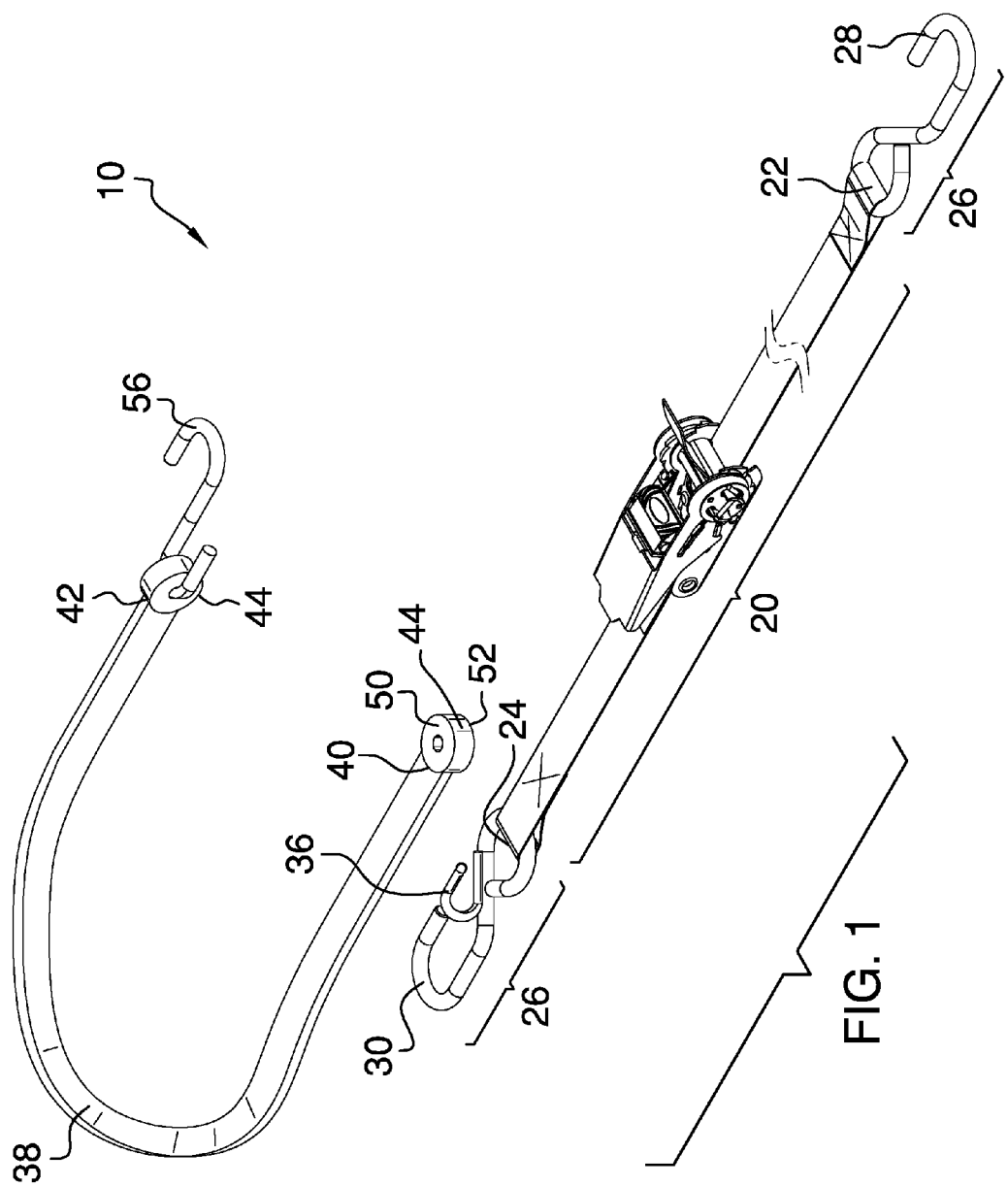
FIG. 1 is a front isometric view.
Figure 2:
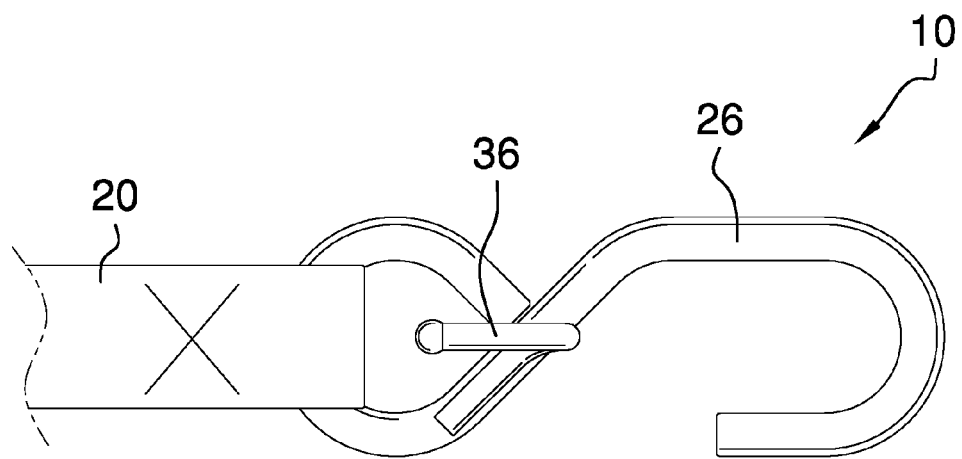
FIG. 2 is a top plan view.
Figure 3:
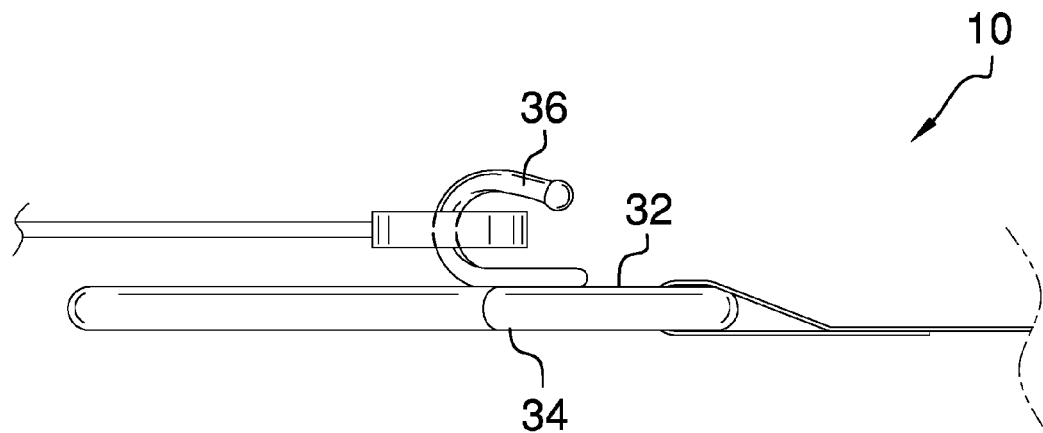
FIG. 3 is a side elevation view.
Figure 4:
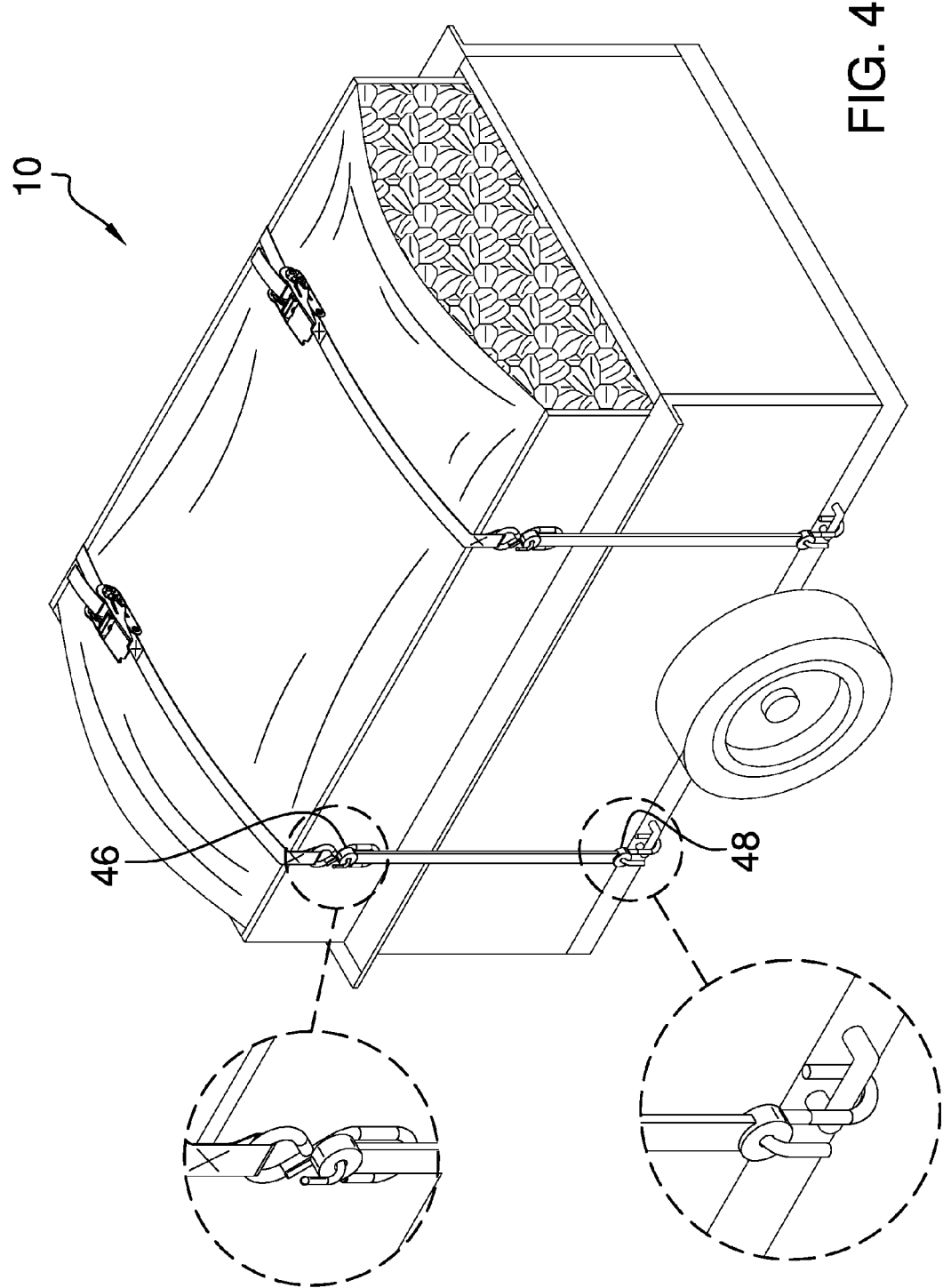
FIG. 4 is an in use view.

With reference now to the drawings, and in particular FIGS. 1 through 4 thereof, an example of the instant adjustable cargo securing strap employing the principles and concepts of the present adjustable cargo securing strap and generally designated by the reference number 10 will be described.

Referring to FIGS. 1 through 4 the present adjustable cargo securing strap 10 is illustrated. The adjustable cargo securing strap 10 includes an adjustable first ratchet strap 20 having a first end 22 and a second end 24. A pair of ratchet strap S hooks 26 includes a first ratchet strap S hook 28 and a second ratchet strap S hook 30, with each of the first ratchet strap S hook 28 and the second ratchet strap S hook 30 having an upper surface 32 and a lower surface 34. Each of the first ratchet strap S hook 28 and the second ratchet strap S hook 30 is attached to each of the first end 22 and the second end 24, respectively, of the adjustable first ratchet strap 20. A substantially C-shaped hook member 36 is upwardly extended and attached to the upper surface 32 of one of the first ratchet strap S hook 28 and the second ratchet strap S hook 30.

The adjustable cargo securing strap 10 further includes a rubberized second strap 38, optionally EPDM rubber, having a proximal end 40 and a distal end 42. A pair of attachment members 44 includes a proximal attachment member 46 and a distal attachment member 48, with each of the proximal attachment member 46 and the distal attachment member 48 having a top side 50, a bottom side 52, and an aperture 54 continuously disposed from the top side 50 to the bottom side 52. Each of the proximal attachment member 46 and the distal attachment member 48 is disposed on each of the proximal end 40 and the distal end 42, respectively, of the rubberized second strap 38. A second strap S hook 56 is disposed through the aperture 54 of the distal attachment member 48, and the substantially C-shaped hook member 36 is selectively slidably engageable within the aperture 54 of the proximal attachment member 46.

What is claimed is:

1. An adjustable cargo securing strap comprising:
   an adjustable first ratchet strap having a first end and a second end;
   a pair of ratchet strap S hooks comprising a first ratchet strap S hook and a second ratchet strap S hook, each of the first ratchet strap S hook and the second ratchet strap S hook having an upper surface and a lower surface, wherein each of the first ratchet strap S hook and the second ratchet strap S hook is attached to each of the first end and the second end, respectively, of the adjustable first ratchet strap;
   a substantially C-shaped hook member upwardly extended and attached to the upper surface of one of the first ratchet strap S hook and the second ratchet strap S hook;
   a rubberized second strap having a proximal end and a distal end;
   a pair of attachment members comprising a proximal attachment member and a distal attachment member, each of the proximal attachment member and the distal attachment member having a top side, a bottom side, and an aperture continuously disposed from the top side to the bottom side, each of the proximal attachment member and the distal attachment member disposed on each of the proximal end and the distal end, respectively, of the rubberized second strap; and
   a second strap S hook disposed through the aperture of the distal attachment member;
   wherein the substantially C-shaped hook member is selectively slidably engageable within the aperture of the proximal attachment member.

2. The adjustable cargo securing strap of claim 1 wherein the rubberized second strap is EPDM rubber.

\* \* \* \* \*